United States Patent [19]
Brookfield

[11] 3,979,834
[45] Sept. 14, 1976

[54] DEVICE FOR MEASURING THE PITCH DIAMETER OF GEARS

[76] Inventor: Richard A. Brookfield, 25 Drumlin Road, Newton, Mass. 12128,

[22] Filed: Jan. 22, 1975

[21] Appl. No.: 543,158

[52] U.S. Cl. ........................ 33/147 M; 33/179.5 R
[51] Int. Cl.² ........................................... G01B 5/08
[58] Field of Search ....... 33/147 M, 147 R, 179.5 R

[56] References Cited
UNITED STATES PATENTS

| | | | |
|---|---|---|---|
| 1,281,805 | 10/1918 | Metzger et al. | 33/147 M |
| 2,295,206 | 9/1942 | Fraumann et al. | 33/179.5 R |
| 2,367,004 | 1/1945 | Chitwood | 33/179.5 R |
| 2,445,402 | 7/1948 | Malmberg | 33/179.5 R |
| 2,623,295 | 12/1952 | Orlandi | 33/179.5 R |
| 2,728,144 | 12/1955 | Nilsson | 33/147 M |
| 3,771,229 | 11/1973 | Reef | 33/147 M |

*Primary Examiner*—Richard E. Aegerter
*Assistant Examiner*—Michael H. Thaler

[57] ABSTRACT

A device for use in measuring the pitch diameter of gears has first and second pin-holding units movable along a straight, inclined pathway with means to lock one unit thereto against movement in a predetermined position relative to a gauge. Each pin extends upwardly from its unit and is backed by a V-shaped projection. A support is adjustable to position a gear in a plane transversely of the exposed ends of the pins with one pin seated between a pair of gear teeth and with a diametrically opposed pair of gear teeth positioned to have the other pin seated between them when the other unit is moved in the appropriate direction. The pins are dimensioned to seat against the pitch line of the teeth against which they are seated with the distance between the pins reflected by the gauge to give the relation of the actual pitch diameter to the ideal.

15 Claims, 8 Drawing Figures

3,979,834

DEVICE FOR MEASURING THE PITCH DIAMETER OF GEARS

BACKGROUND REFERENCES

United States Letters Patent Nos. 2,295,206, 2,367,004, 2,445,402, 2,623,295, 2,728,144, 3,771,229.

BACKGROUND OF THE INVENTION

The proper functioning of gear trains often requires that the gears used therein be accurate within close tolerances with respect to several measurements of which pitch diameter measurements are the most common.

Various devices have been proposed for measuring the pitch diameters of gears but these have not been well suited for maximum convenience and accuracy in use and where the distance between the pitch lines of two proximate teeth is small.

THE PRESENT INVENTION

The present invention has for its general objective the provision of devices for measuring pitch diameters of gears including those where the distance between the pitch lines of proximate gear teeth is small, 0.0144 of an inch by way of example and not by way of limitation.

In accordance with the invention this objective is attained with a device having a pair of identical pins, each of a diameter appropriate for the distance between the ideal pitch lines of any two teeth of a particular gear. The device has first and second pin holding units movable towards and away from each other along a straight and preferably inclined pathway. One unit is locked to the pathway in a position relative to a gauge that is appropriate if measured pitch diameter of the gear is ideal. One end of each pin is detachably secured in a holding unit with its other end exposed. Means are provided to support a gear in a plane transversely of the exposed ends of the pins and in a position such that with the pin of the fixed unit seated between one pair of its teeth, the diametrically opposed space between an opposite pair of teeth is in a position to receive the pin of the other pin holding unit, which unit actuates the gauge to give measurements of any departure, whether plus or minus, from the ideal pitch diameter. Each unit includes a V-shaped projection that, at least in the case of pins of such small diameters that they are easily flexible, backs the exposed end of a pin and is itself dimensioned to avoid contact with the sides of the gear teeth between which said pin end is seated.

Another objective of the invention is to provide a device for use with either internally or externally toothed gears, an objective attained with a device having a base and a bed with the bed having the lengthwise channel defining the pathway for the pin holding units. The bed is connected to the base so that it may be positioned in an upwardly and forwardly inclined position for use with gears having external teeth and downwardly and forwardly inclined with gears having internal teeth. Such a device has two fixed clamps for the gauging means, one clamp for the appropriate one of said gear types.

Another objective of the invention is to provide gear supporting means that are adjustable relative to the fixed pin holding unit and to the particular gear.

Yet another objective of the invention is to provide pin holding units that are adapted for use in securing supporting pins of the same length but of diameters that vary throughout a substantial range. This objective is attained with units that include holders, each having a base slidably held in the pathway and each having an upwardly opening socket in the form of a slot, the slots of the two units being in alignment. A slide is provided for each socket and the sockets and the slides have complemental, interengageable, V-shaped portions, the V-shaped recess being a pin-receiving seat and the V-shaped projection being engageable with the seated pin. Each unit also includes means by which the slide is held in clamping engagement with the seated end of the pin. In the case of a gear having external teeth, the socket has the V-shaped seat and the slide, the projection and in the case of a gear having internal teeth, it is the socket that includes the V-shaped projection with the slide having the V-shaped recess.

BRIEF DESCRIPTION OF THE DRAWINGS

In the accompanying drawings, the preferred embodiment of the invention is shown

Figure 1:
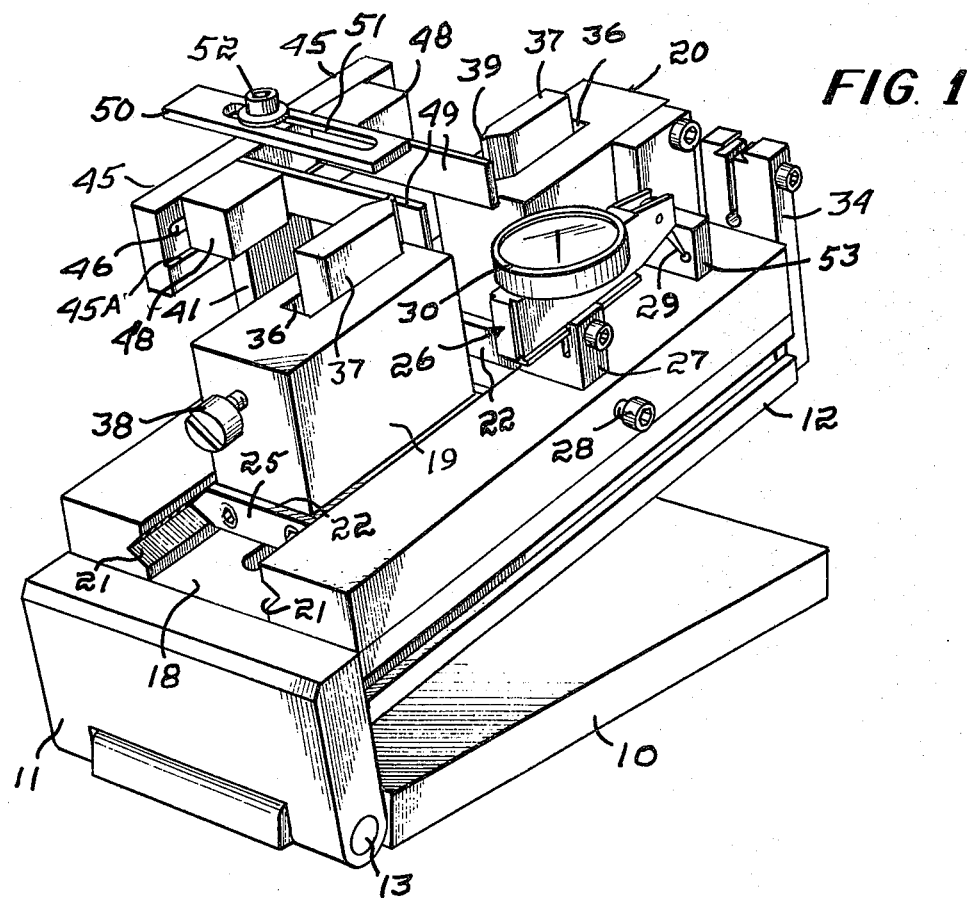
FIG. 1 is a perspective view of the device positioned for use in measuring the pitch diameter of an externally toothed gear.
Figure 2:
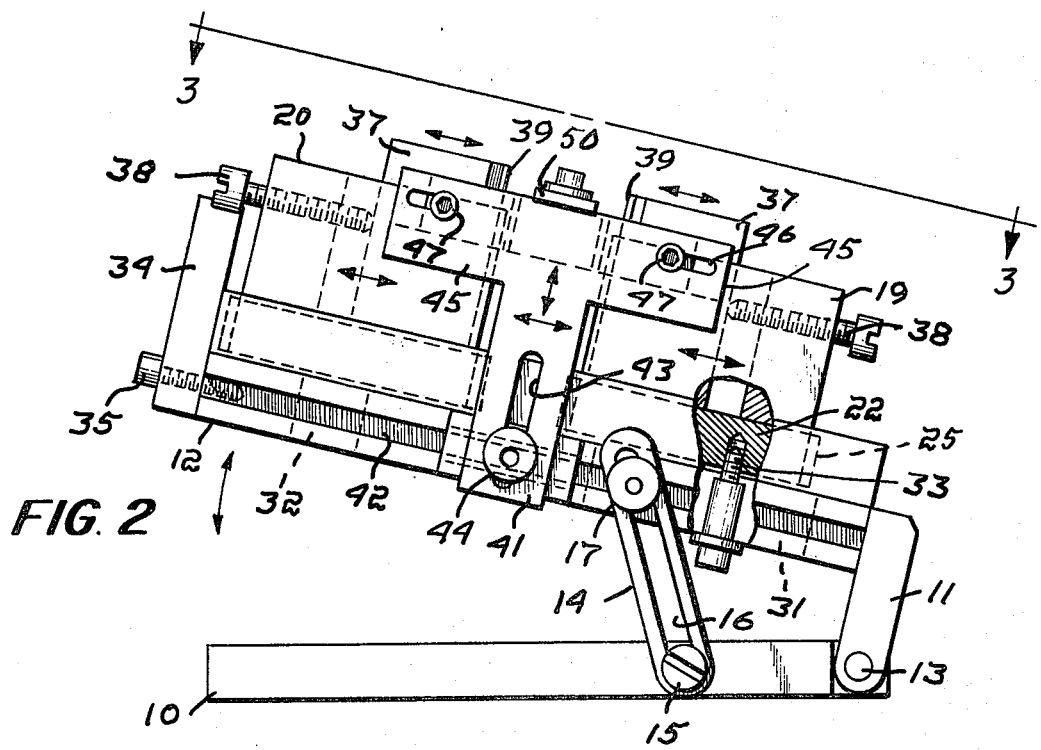
FIG. 2 is a view of the side of the device opposite to that shown in FIG. 1.
Figure 3:
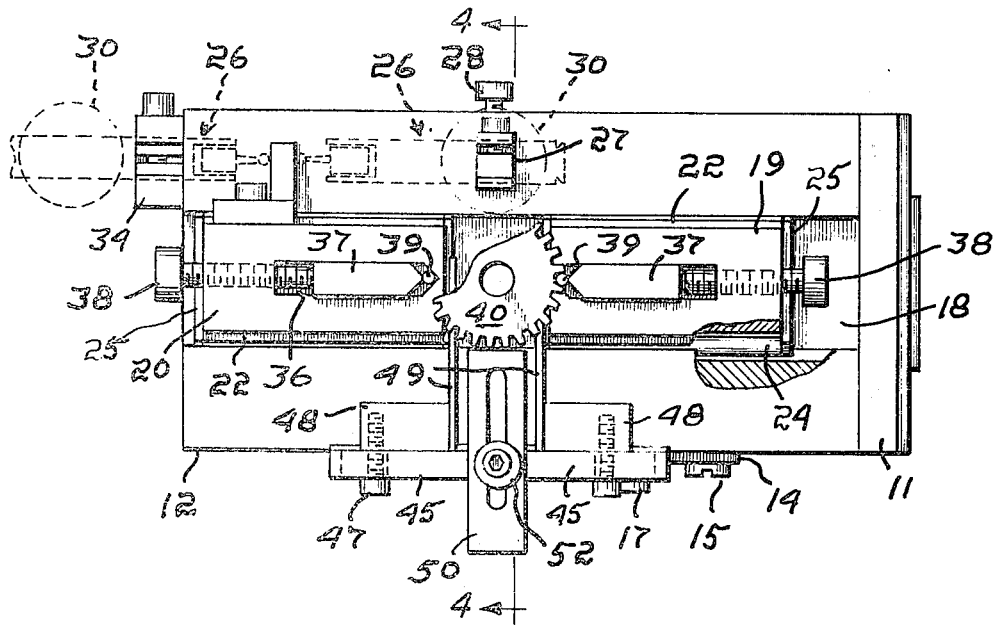
FIG. 3 is a top plan view of the device illustrating the two positions of the dial indicator and with a gear in position for a pitch diameter measurement.

In the embodiment of the invention illustrated by the drawings, the device for measuring the pitch diameters of gears has a base 10 to one end of which the support 11 of a bed 12 is connected by means of a pivot 13. The base 10 has, see FIG. 2, an arm 14 connected to one of its sides by a pivot 15 and provided with a lengthwise slot 16. The stem of a lock 17 extends freely through the slot 16 and is threaded into the corresponding side of the bed 12 to enable the free end thereof to be raised to establish, for use, a selected angular relation between the bed 12 and the base 10 and then locked in that position. When a gear has external teeth, the bed 12 is upwardly inclined so that its free end is the higher, as shown in FIGS. 1 and 2, and in the case of a gear having internal teeth, the bed is downwardly inclined with its free end resting on the base 10.

Figure 4:
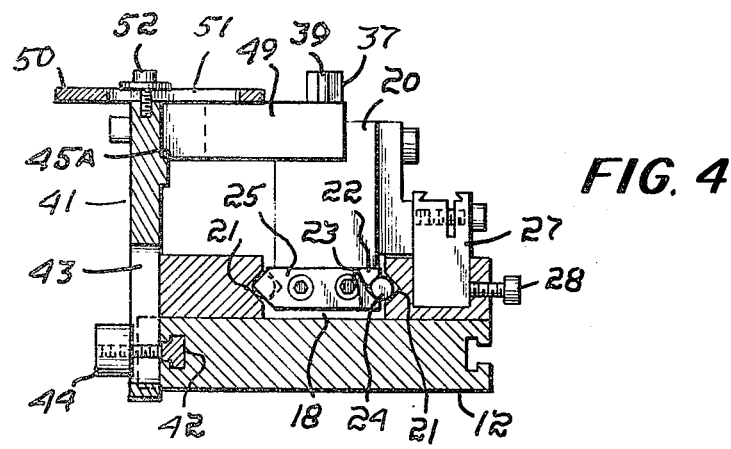
FIG. 4 is a section taken approximately along the indicated line 4—4 of FIG. 3 but with the base omitted.
Figure 5:
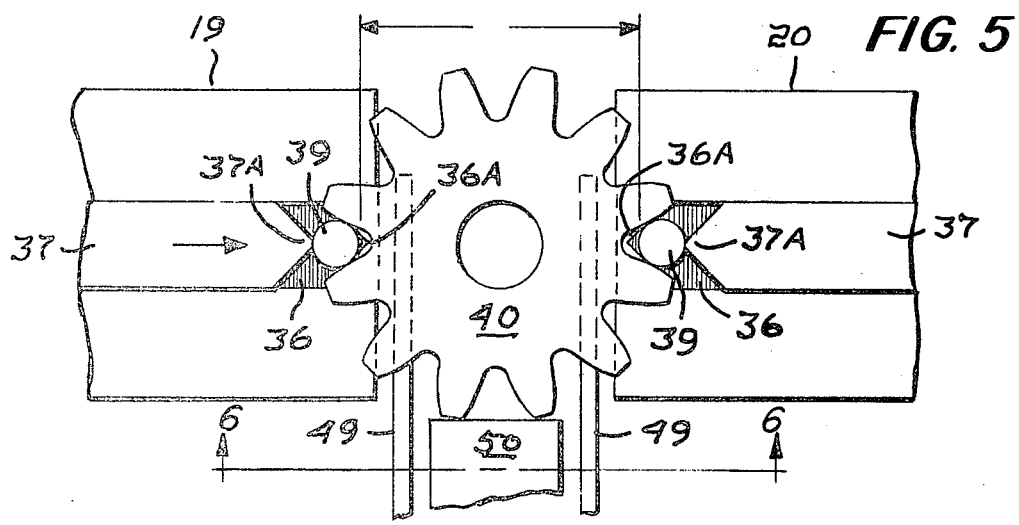
FIG. 5 is a fragmentary view, on a substantial increase in scale, showing the two pins seated against the pitch lines of two diametrically opposed pairs of adjacent teeth.
Figure 6:
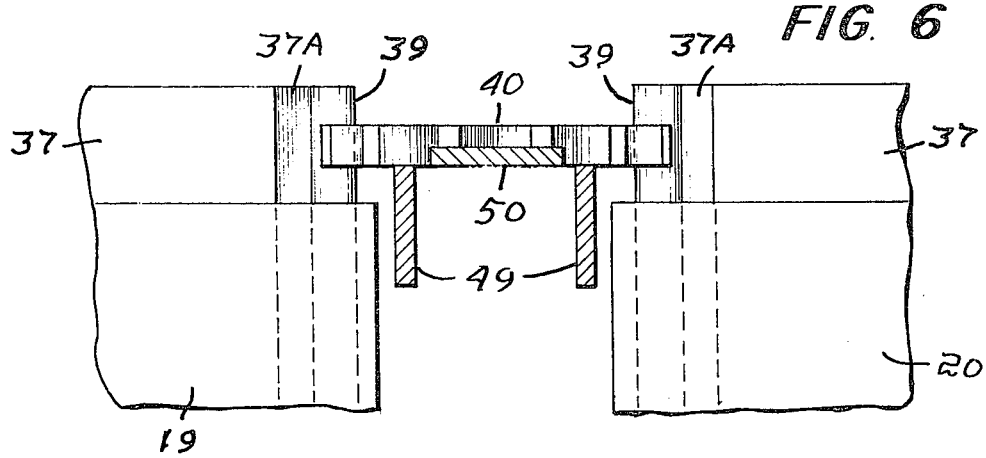
FIG. 6 is a section taken approximately along the indicated line 6—6 of FIG. 5.

The bed 12 has a central straight channel 18 extending from end-to-end thereof to define a pathway slidably receiving holders 19 and 20 and extends from end-to-end thereof and is provided with marginal V-shaped grooves 21 opening towards each other. Each holder has a base 22 dimensioned for entry in the channel 18 and formed with grooves 23, see FIG. 4, extending from end-to-end of each side thereof. The grooves 21 and 23 receive base-supporting bearings 24, desirably roller bearings, each extending the full length of a holder base 22 and held in place by keepers 25 secured to the ends thereof.

A dial gauge, generally indicated at 26, is detachably secured to the bed 12 by means of a clamp 27 secured in a bed socket by means of a set screw 28. The gauge 26 is of a conventional type having a pivotable contact finger 29 operable as it swings in either direction to cause corresponding measurements to be shown on its dial 30 with reference to a "zero" reference.

The channel 18 has lengthwise slots 31 and 32 for the holders 19 and 20, respectively, with the slot 31 being shown as somewhat longer than the slot 32. The slots 31 and 32 enable locking screws 33 to extend upwardly therethrough and be threaded into the base 22 of the appropriate holder to hold it captive and to lock it in a selected position against movement lengthwise of the channel 18. In practice and for reasons later to be apparent, only the holder 19 is set and locked in a predetermined position appropriate for the particular gear whose pitch diameter is to be checked and, accordingly, the locking screw 33 for the holder 20 is omitted as a clamp 34 secured to the free end of the bed 12 by a screw 35 blocks the proximate end of the channel 18 to prevent the accidental escape of the holder 20 therefrom.

Each of the holders 19 and 20 has an upwardly opening socket 36 in the form of a slot with the sockets of the two holders in alignment and each defining a slideway for a slide or block 37. The holders 19 and 20 are for use in the measurement of the pitch diameters of gears having external teeth and the proximate ends of their slideways have vertically disposed V-shaped recesses 36A and each slide 37 has one end formed with a complemental projection 37A and is dimensioned to protrude well above the upper surface of the holder in which it is positioned and is of a length such that it may have some movement lengthwise of its socket 36. A screw 38 is threaded through the other end of each holder and into its socket 36 to engage with the end of the slide 37 therein and is adjustable to slide it forwardly towards the recess 36 of that holder so that each recess and the associated projection function as a clamp.

In accordance with the invention, pairs of pins 39 are provided with the pins of each pair of the same length and of a diameter such that each will fit between any two proximate teeth of a particular gear 40 and engage with the pitch lines thereof. Each pin 39 is, when gears 40 are to be checked for their pitch diameters, placed in the seat defined by the V-shaped recess 36A of a slideway 36 with the V-shaped projection 37A of a slide 37 positioned to clamp the seated pin therein and with the screw 36 holding the slide 37 in its pin-clamping position. It will be noted that the length of the pins 39 is such that, when seated, a substantial portion protrudes above the holders and that the slides 37 are dimensioned so that their V-shaped projection 37A backs the protruding ends of the pins 39. It will also be noted that the apex of each V-shaped projection 37A provides a backing support for a pin and is of a width considerably less than the diameter of the pin and is also shaped and dimensioned to avoid contact with the sides of the gear teeth between which a pin 39 is seated.

While the relationship between the holders 19 and 20 and the gauge 26 is obviously critical, it is also necessary to be able to hold position a gear 40 in an appropriate position relative to the pins 39 and to the pathway defined by the channel 18. To this end, a holder 41 is supported normal to the bed 12 in a channel 42 that extends lengthwise of a side thereof. The holder 41 has a lengthwise channel 43 through which extends a lock 44 which is threaded into the bed 12 so that the holder 41 may be locked in a predetermined position lengthwise of a channel 43 and in a predetermined vertical position relative thereto. The holder 41 has arms 45 extending in opposite directions in the plane parallel to the bed 12. Each arm 45 has a lengthwise slot 46 through which extends a locking screw 47 threaded into a block 48 resting on a shoulder 45A and provided with a supporting member 49 on which the gear 40 is placed, the vertical adjustment of the holder 41 being such that the supported gear is in a plane inclusive of the exposed ends of the pins 39. A spacer 50 has a lengthwise slot 51 through which extends a locking screw 52 threaded into the center of the upper end of the holder 41 in a position to engage with the periphery of the gear 40 when positioned on the member 49.

In practice, in checking the pitch diameter of the gear 40 the holder 19 is locked in a position in which its pin 39 has a predetermined relationship with the gauge 26 that is based on the ideal pitch diameter for that particular gear and the gear holder 41 is adjusted lengthwise of vertically relative to the bed 12 so that the members 49 hold the gear 40, when placed thereon, in a plane inclusive of the protruding ends of the pins 39 with the members 49 spaced apart as required by the gear and with the spacer 50 positioned to facilitate the positioning of a gear 40 with its axis in alignment with the pins 39. The pin holder 20 is placed in a position in which it does not interfere with the placing of the gear on the support members 49 with the pin 39 of the holder 19 seated between a pair of gear teeth and the diametrically opposed space between another pair of gear teeth in a position to receive the pin of the holder 20 on appropriate movement thereof towards the holder 19.

While such movement may be otherwise effected, with the mount 20 free to slide and the bed 12 inclined as shown in FIGS. 1 and 2, the mount 20, when released slides in response to gravity, to seat its pin 39 between the proximate pair of gear teeth and in contact with the sides thereof. The mount 20 has a shoulder 53 engageable with the actuating finger 29 of the gauge 26. If the pitch diameter is ideal, pins engage the pitch lines of the gear teeth between which they are seated and the dial reading will be zero but otherwise the dial reading will show the plus or minus departures from the ideal pitch diameter.

Figure 7:
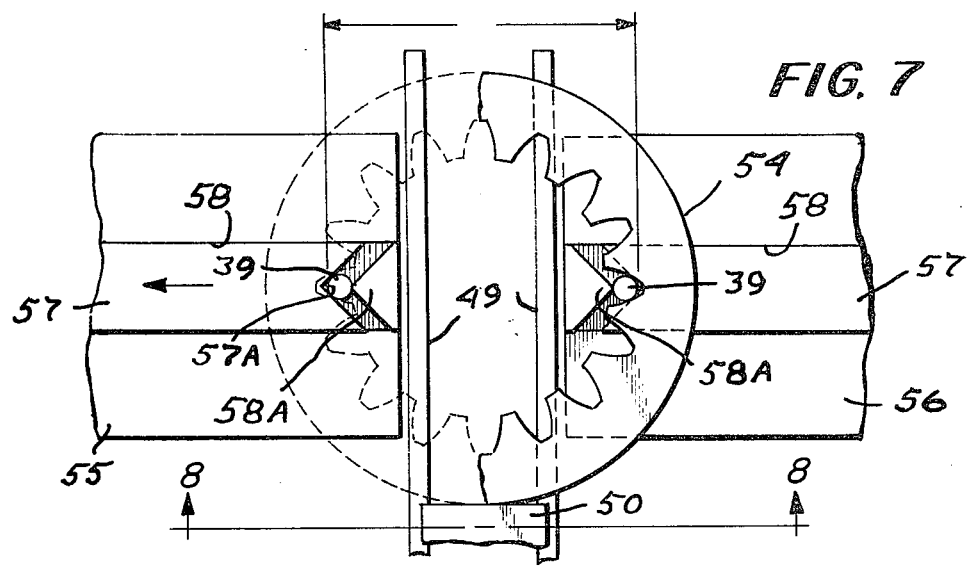
FIG. 7 is a view similar to FIG. 5 but with the device for use in the measurement of the pitch diameter of internally toothed gears.
Figure 8:
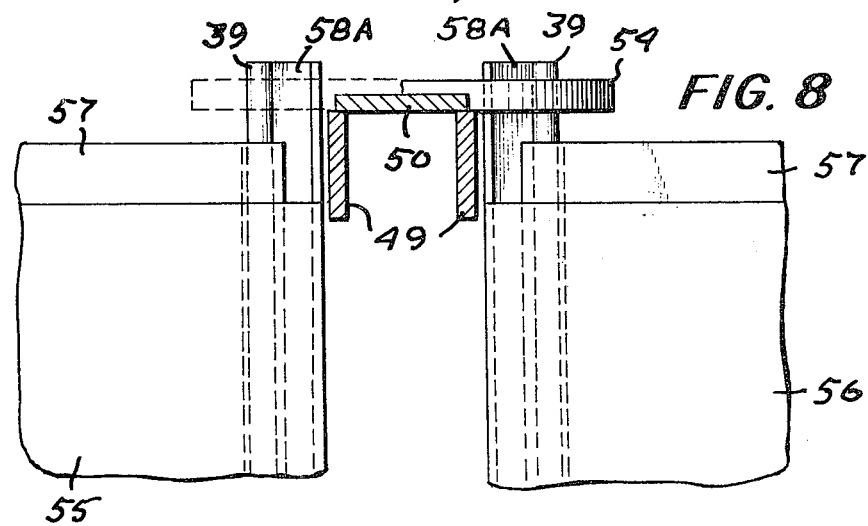
FIG. 8 is a section taken approximately along the indicated line 8—8 of FIG. 7.

For the measurement of the pitch diameter of gears having internal teeth, the gear 54, for example, the holders 55 and 56, see FIGS. 7 and 8, are used in place of the holders 19 and 20 and slides 57 are substituted for the slides 37. The holders 55 and 56 are identical to the holders 35 and 36 but have the proximate ends of their sockets 58 formed with V-shaped projections 58A which extend above the slides 57. The slides 57 are identical to the slides 37 except that their proximate ends are formed with V-shaped recesses 57A defining seats for the pins 39 with the pins held therein by their engagement with the projections 58A when the slides 57 are held in their clamping position in the same manner as the slides 37.

While the general procedure in measuring the pitch diameter of the gear 54 is the same as that in the case of the gear 40, the bed 12 is now positioned with its free end resting on the base 10. The gauge 26 is now held by the clamp 34 with its finger 29 disposed to be engaged and actuated by the shoulder 53 of the holder 56 and it slides away from the holder 55. With the holder 55 in its appropriate fixed position relative to the gauge 26 and with the holder 56 held so that the gear 54 may be seated on the gear support in the same manner as the gear 40 but with the pin 39 of the holder 56 within the gear 54, movement of the holder 56 by gravity seats the pin thereof between a pair of gear teeth with the movement of the holder 56 also actuating the gauge 26 to provide a measurement of the plus or minus departure of the measured pitch diameter relative to the ideal pitch diameter for the gear 54.

I claim:

1. A device for use in measuring the pitch diameter of a gear, said device including a base, a slideway extending lengthwise of said base, a dial gauge attached to said base, a pair of slides movable along the slideway towards or away from each other, the proximate ends of the slides the front ends thereof, each slide having an upwardly opening socket extending into its front end, a pair of pins of a diameter appropriate for the ideal distance between the pitch lines of any two teeth of said gear, one pin in each socket and extending vertically therefrom, means to clamp each pin in its socket with the two pins in a common lengthwise plane, means to hold one slide against movement along the slideway with the pin thereof in a predetermined position relative to the gauge, means to support a gear over said slideway with diametrically opposed gear teeth protruding therefrom towards opposite ends of the slideway and in a plane above the open ends of the sockets and with one pair of gear teeth seated against the pin of the held slide and a diametrically opposed pair of teeth in a position to receive the other pair of gear teeth on appropriate movement of the other slide, means connected to said other slide and operable to actuate the gauge on such movement, each of said pin clamping means including a clamping member which and said socket include coacting portions of which one is a vertical, V-shaped, pin-receiving channel establishing said lengthwise plane and the other a V-shaped pin engaging and backing projection extending the full length of the pin and dimensioned to avoid contact with the gear teeth and means connecting said slideway to said base in a downwardly inclined position, said other slide free to slide along said slideway in a predetermined direction relative to the fixed slide to enable its pin to engage said diametrically opposed pair of gear teeth.

2. The device of claim 1 in which the particular gear has external teeth, each slide has the V-shaped projection and the socket thereof includes the V-shaped recess.

3. The device of claim 2 in which each slide is dimensioned to protrude from the socket in which it is located.

4. The device of claim 1 in which the particular gear has internal teeth, each slide includes the V-shaped recess and the socket thereof includes the V-shaped projection.

5. The device of claim 1 in which the connecting means includes, a hinge connecting corresponding ends of the base and the slideway and enabling said slideway to be upwardly or downwardly inclined, and adjustable means interconnecting the base and the slideway to lock the base and the slideway in a desired inclined relationship.

6. The device of claim 5 in which the unit locking means is connected to the base of the unit proximate to the hinge.

7. The device of claim 1 in which, each slide includes a base within the slideway, both sides of each base and both sides of the slideway have lengthwise channels, bearing means in each base channel extending substantially the full length thereof and entrant of the appropriate slideway channel and means secured to the ends of the bases confining said bearings.

8. The device of claim 7 in which the bearing means are roller bearings.

9. The device of claim 1 in which the gear supporting means includes a support adjustable lengthwise of the base and vertically relative thereto and provided with a pair of gear supporting oppositely extending members, means attaching said members to the upper end of the support in a laterally spaced relationship, a spacer, and means attaching the spacer to the support for engagement with the supported gear.

10. The device of claim 9 in which the attaching means for the supporting members are adjustable to enable them to be moved towards or away from each other and the attaching means for the spacer enables its position to be adjustable towards or away from the pathway.

11. The device of claim 1 and means pivotally connecting one end of the slideway to the base for movement between upwardly and forwardly and downwardly and forwardly inclined positions.

12. The device of claim 1 in which the gear has external teeth and the fixed slide is below said other slide, said other slide sliding towards the fixed slide.

13. The device of claim 1 in which the gear has internal teeth and the fixed slide is above said other slide, said other slide sliding away from the fixed slide.

14. The device of claim 1 in which the connecting means is adjustable to enable the slideway to be downwardly inclined relative to either end of the base, and means detachably connect the gauge to the bed in either one of two positions, one position for each direction of travel of said other slide.

15. The device of claim 1 in which each clamping member is slidable towards and away from the front end of its slide and a member threaded through the rear end of the slide is in engagement with the clamping member to effect the clamped engagement of the associated pin.

* * * * *